United States Patent [19]
Gandel

[11] Patent Number: 6,020,804
[45] Date of Patent: Feb. 1, 2000

[54] ELECTROMAGNETIC ACTUATOR MAGNETICALLY LOCKED INTO TWO OR MORE STABLE POSITIONS

[75] Inventor: Pierre Gandel, Montfocon, France

[73] Assignee: Sonceboz S.A., Sonceboz, Switzerland

[21] Appl. No.: 08/952,494

[22] PCT Filed: May 31, 1996

[86] PCT No.: PCT/FR96/00824

§ 371 Date: May 15, 1998

§ 102(e) Date: May 15, 1998

[87] PCT Pub. No.: WO96/38904

PCT Pub. Date: Dec. 5, 1996

[30] Foreign Application Priority Data

May 31, 1995 [FR] France .................................. 95 06490

[51] Int. Cl.$^7$ ........................................................ H01F 7/08
[52] U.S. Cl. .......................... 335/272; 335/266; 310/154
[58] Field of Search .................................. 335/272, 266, 335/268, 269, 270, 271, 279, 281, 282, 220, 228, 229, 230, 234; 310/154, 46, 33, 35, 36, 39

[56] References Cited

U.S. PATENT DOCUMENTS

| | | | |
|---|---|---|---|
| 3,889,219 | 6/1975 | Larner | 335/234 |
| 3,959,672 | 5/1976 | Walker et al. | 310/36 |
| 4,698,535 | 10/1987 | Shiraki et al. | 310/156 |
| 4,899,073 | 2/1990 | Takeuchi et al. | 310/116 |

*Primary Examiner*—Lincoln Donovan
*Attorney, Agent, or Firm*—Oblon, Spivak, McClelland, Maier & Neustadt, P.C.

[57] ABSTRACT

An electromagnetic actuator has four positions which are stable in the absence of a current and moves rapidly between these positions when acted upon by a current. The actuator has a thin, rotatable magnet (3) with two pairs of magnetic poles transversally magnetised in alternate directions, and a stator member having four pole pieces (9–12, 34–37, 48–51) of developed length P, each with an excitation coil. Two consecutive poles of the thin magnet (3) are spaced by a distance d. The thin magnet (3) is movable in an airgap of width E. wherein the size ratio P:E and P:d is greater than 8. The invention is useful for driving a device such as a valve or a switch.

14 Claims, 8 Drawing Sheets

ELECTROMAGNETIC ACTUATOR MAGNETICALLY LOCKED INTO TWO OR MORE STABLE POSITIONS

TITLE OF THE INVENTION

BACKGROUND OF THE INVENTION

Field of the Invention

The present invention relates to an electromagnetic actuator intended to operate devices such as valves or switches and having a plurality of possible states, controlled by the positioning of a rotary element.

Discussion of Background

The displacement detween two consecutive stable positions constitutes a rapid transition achieved by application of a current in at least one pair of coils. The operation of such devices by electric motors usually necessitates the use of locking mechanisms to guarantee positioning at rest in one of the sought positions after a rotary displacement, and to prevent untimely displacements in the absence of control signals. The prior art teaches the technique of actuators provided with a rotor disposed in the air gap of a stator structure formed by a first magnetic circuit provided with four pole shoes, each equipped with an exciting coil. The rotor has a magnetized thin portion comprising two pairs of thin poles magnetized transversely in opposite directions. Such actuators are intended in particular for control of valves or switches. These actuators exhibit the feature of having a broad zone in which the force is constant. As a result, it is possible to construct actuators having very great reproducibility and very great angular precision under automatic control.

To achieve positions that are stable in the absence of current, the prior art actuators are usually provided with a ratchet wheel to lock the position of the actuator after a displacement. The mechanical parts employed for locking are a source of noise and wear. In addition, they lead to higher ts for manufacture and assembly of such actuators.

SUMMARY OF THE INVENTION

The object of the present invention is to construct an actuator provided with at least two stable positions, with a strong locking torque with or without current, not necessitating mechanical locking parts.

To this end the present invention relates to an electromagnetic actuator having four positions that are stable in the absence of current, for operation of a device such as a valve or switch, the actuator being provided with a thin rotationally movable magnet, having two pairs of magnetic poles magnetized transversely in alternate directions, and a stator structure provided with four pole shoes of developed length P, each equipped with an exciting coil, two consecutive poles of the thin magnet being separated by a distance d. The thin magnet is movable in an air gap of dimension E, the dimensional ratios P/E and P/d being larger than 8.

Such an actuator has a locking torque of almost 30% of the motor torque when the diametral plane separating the two magnets is in one of the planes passing between two pole shoes.

Such an actuator can be constructed in two variants: a first variant in which the movable portion has the shape of a disk, and a second variant in which the movable portion has the shape of a tube.

According to the first variant, the movable portion comprises a yoke of circular cross section integral with a thin magnet in the shape of a disk, having two complementary sectors extending for about 180° and magnetized in two opposite axial directions, the pble shoes of the stator portion disposed facing the movable magnet having an annular shape extending for about 90°.

Advantageously, the semi-annular surface of the pole shoes of the stator portion is extended by a foot of smaller cross section, the exciting coil encircling the said foot.

Preferably the shoes are integral with a disk-shaped magnetic-flux closing part.

According to one particular embodiment, the stator structure comprises a first ferromagnetic part having two pole shoes and a second ferromagnetic part having two pole shoes, the two stator parts being disposed on both sides of the thin disk-shaped magnet, the planes passing through the top surface of the pole shoes being spaced apart by a distance d, and the two stator parts being offset by 90°.

According to a second constructional variant, the stator portion is formed by an inner part of cylindrical shape of ferromagnetic material, having two diametrically opposite lateral notches for positioning of an electric coil, and by a peripheral part of tubular shape having two longitudinal inner grooves for positioning of a second electric coil, the median planes of the two coils being perpendicular.

According to a first embodiment, the movable portion comprises a yoke of cylindrical shape and a thin cylinder-shaped magnet having two complementary tile-shaped sectors extending for about 180° and magnetized in two opposite radial directions.

Advantageously, the stator portion is formed by an inner part of cylindrical shape of a ferromagnetic material, having two diametrically opposite lateral notches for positioning of an electric coil, and by a peripheral part of tubular shape having two longitudinal inner grooves for positioning of a second electric coil, the median planes of the two coils being perpendicular.

According to a second embodiment, the stator structure is formed by an inner part of cylindrical shape of a ferromagnetic material, and by a peripheral part of tubular shape having four longitudinal inner grooves for positioning of four electric coils, the median planes of the two coils being angularly offset by 90°.

BRIEF DESCRIPTION OF THE DRAWINGS

The present invention will be better understood in the description hereinafter, provided with reference to the drawings, wherein:

FIG. 1 represents an exploded view of an actuator according to the first constructional variant.

DETAILED DESCRIPTION OF THE PREFERRED EMBODIMENTS

Figure 1A:
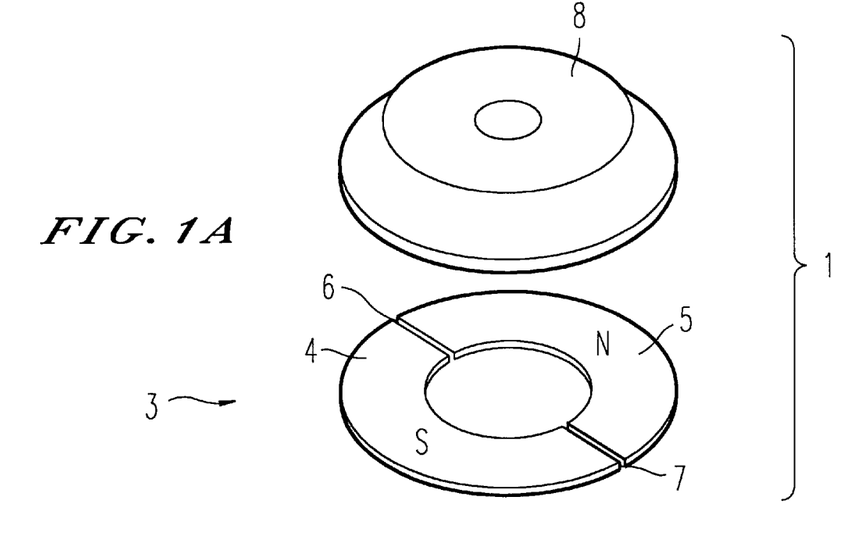
FIG. 1 represents an exploded view of an actuator according to the first variant.
Figure 1B:
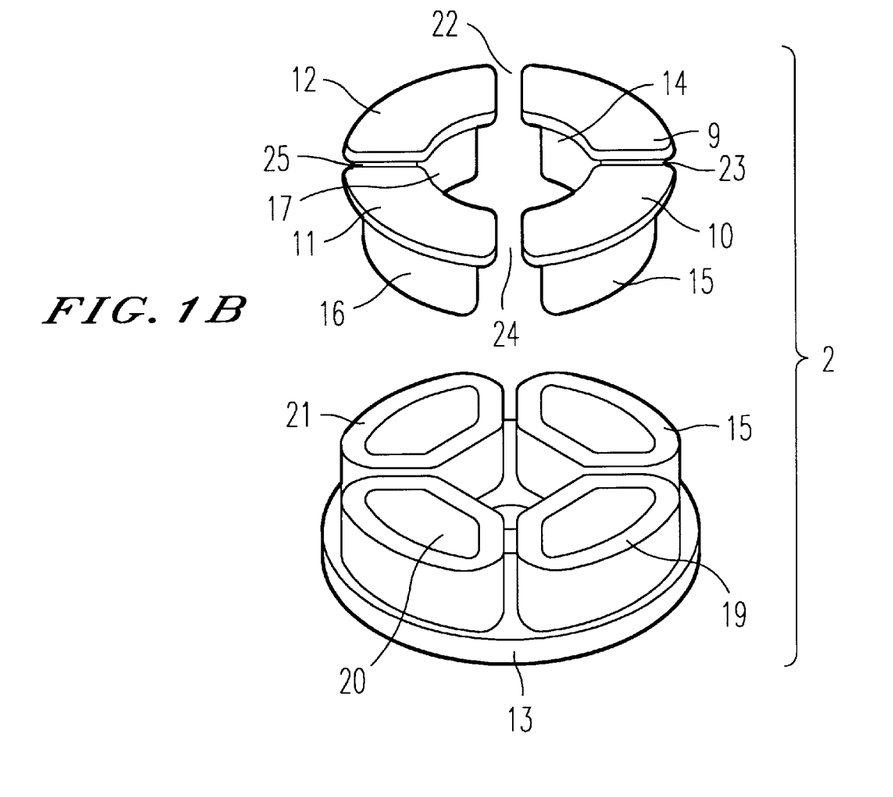

The actuator comprises a movable portion (1) and a fixed portion (2).

The movable portion (1) is provided with a thin magnet (3) formed from two pairs of poles (4, 5) magnetized axially in opposite directions, each extending for about 180°. The transitions (6, 7) between two pairs of poles (4, 5) are smaller than 1°. The magnet (3) is constructed by joining two half magnets or preferably by magnetizing two sectors of a thin disk of a material such as ferronickel or any other material used for construction of permanent magnets.

The movable portion (1) is also provided with a yoke (8) of ferromagnetic material. The magnet (3) is attached close to this yoke (8).

The fixed portion comprises four pole shoes (9 to 12) formed by annular sectors extending for almost 90° and attached by feet (14 to 17) to a flux-closing plate (13). Electric coils (18 to 21) encircle the feet (14 to 17) to excite the pole shoes (9 to 12). Two pole shoes are separated by a free space (22 to 25), the length of which, measured along the mean perimeter, is d.

The actuator functions as follows:

In rest position No. 1, the first pair of magnet poles (4) having the SOUTH pole up is aligned with the two shoes (10, 11), the other pair of magnet poles (5) being aligned with the other two shoes (9, 12). The transitions (6, 7) are aligned respectively with the diametrically opposite spaces (25), (23).

This first rest position is stable in the absence of current. It is necessary to apply a significant torque to displace the movable portion.

In what follows, it will be considered that the flow of a positive (or respectively negative) current in one of the coils tends to cause the North (or respectively SOUTH) pole of the magnet to be displaced until the potential of the magnetic poles is added to that of the magnet.

Departure from rest position No. 1 is achieved by energizing the two consecutive coils (20, 21) positively and the two consecutive coils (18, 19) negatively. The movable portion is then displaced by 90°, ultimately occupying a rest position No. 2. This position corresponds to alignment of the first pair of magnet poles (4) having the SOUTH pole up with the two shoes (11, 12), the other pair of magnet poles (5) being aligned with the other two shoes (9, 10). The transitions (6, 7) are aligned respectively with the diametrically opposite spaces (22), (24).

To return from rest position No. 2 to rest position No. 1, it is necessary to energize the two coils (19, 20) positively and to energize the two coils (18, 21) negatively.

If the actuator is intended to cause an element to pivot between two positions offset by 90°, as for a valve control, the two diametrically opposite coils (18, 20) are always energized in the same manner. Pivoting from one of the positions to the other position is achieved by inverting the polarity of energization of the other two diametrically opposite coils (19, 21).

It is also possible, by combined energization specific to the purpose, to displace the movable element (1) into the other rest positions that are offset by 90° relative to the rest positions No. 1 and No. 2.

Figure 2:
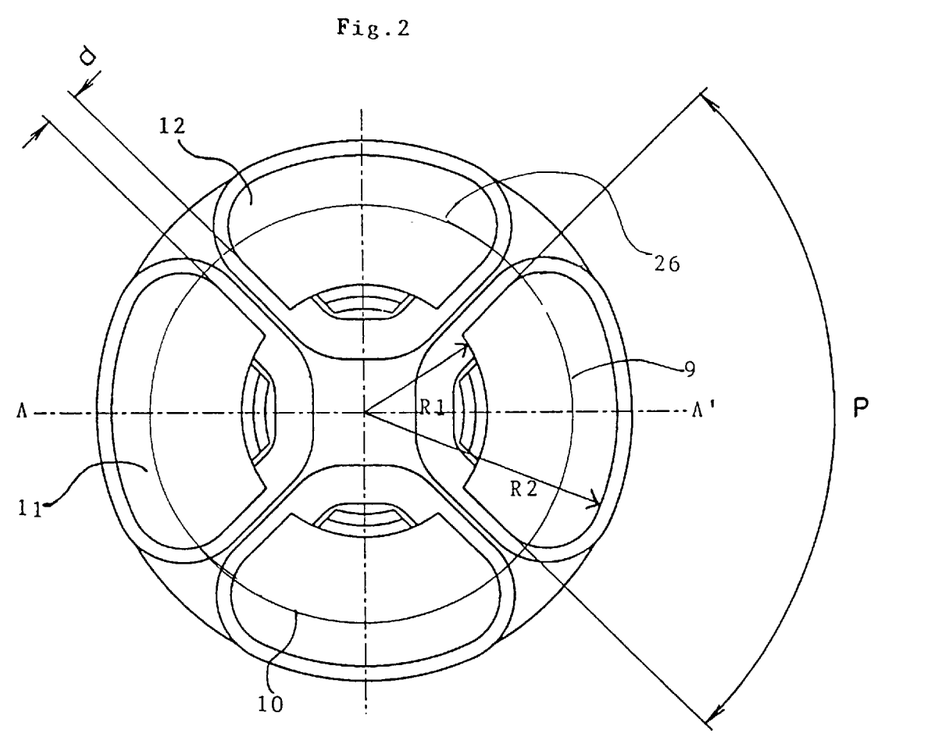
FIG. 2 represents an overhead view of the pole shoes.

FIG. 2 represents an overhead view of the pole shoes.

The dimensional characteristics are determined by measurement along the mean perimeter (26). The mean perimeter (26) is the circle whose radius corresponds to the mean between the radius R1 of the inner edge of the shoes (9 to 12) and the radius R2 of the outer edge of the shoes (9 to 12).

In the following,

P designates the width of the pole shoes (9 to 12),

E designates the air gap between the top of the pole shoes (9 to 12) and the bottom surface of the movable yoke (see FIG. 4), d designates the distance between two consecutive pole shoes (9 to 12).

One of the characteristics necessary to achieve the technical effect constituting the object of the invention, or in other words optimization of the amplitude and stiffness of the currentless locking torque, lies in the choices of dimensional ratios.

A large value, typically greater than 8, will be chosen for the ratio P/E. A value close to P/8 will be chosen for the distance d.

Figure 3:
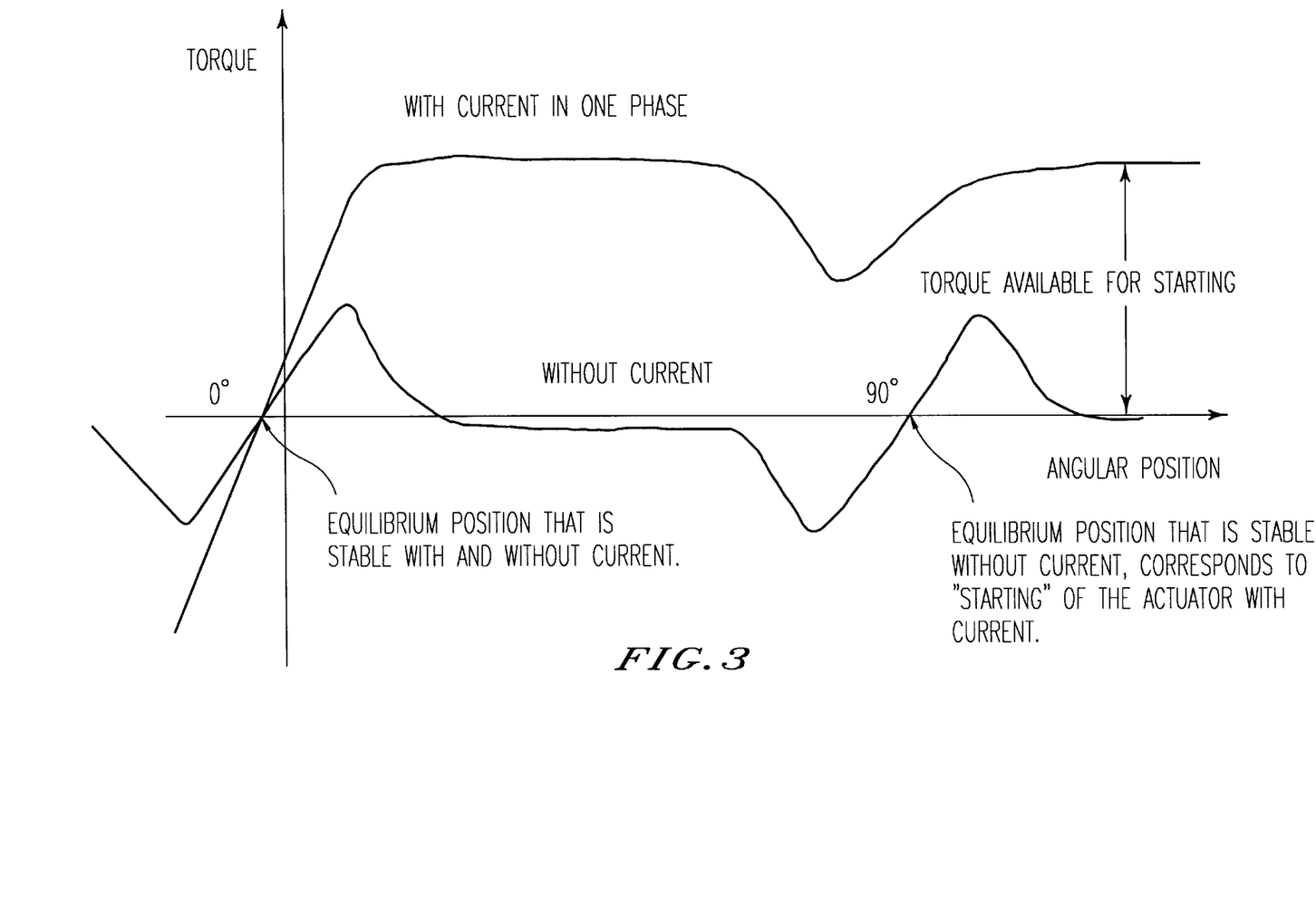
FIG. 3 represents the curve of actuator torque versus position.

In this case, the actuator exhibits maximum currentless locking torque (typically 30% of the nominal torque with current) over the four stable positions, and maximum stiffness of this currentless torque law (typically 10 mNm/degrees), while retaining a starting torque sufficient for acceleration of the rotor and an end-of-travel stiffness with current on sufficient to brake the rotor. FIG. 3 represents a typical example of the end of torque with or without current as a function of position.

Figure 4:
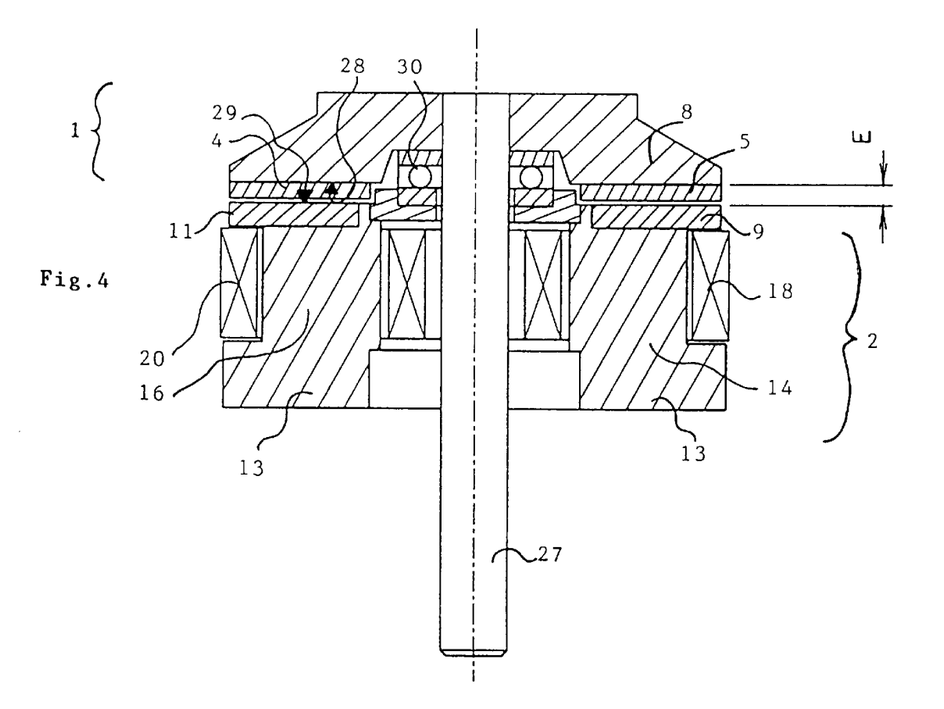
FIG. 4 represents a median sectional view of the actuator.

FIG. 4 represents a median sectional view of the actuator through the plane A–A'.

The movable portion (1) is integral with a shaft (27) passing through the stator portion (2). The air gap E separating the bottom surface (28) of the yoke (2) and the top surface (29) of the pole shoes (9 to 12) is determined by means of a thrust ball bearing (30). Positioning of the movable portion (1) and of the stator portion (2) is ensured by the magnetic attraction of the permanent magnets, thus avoiding the use of additional mechanical means to ensure immobilization of the shaft relative to the stator structure (2). In the described example, therefore, the actuator has a single stop acting to limit the axial travel in the direction of the movable portion (1) toward the stator portion (2), but does not have a stop in the opposite direction.

Figure 5A:
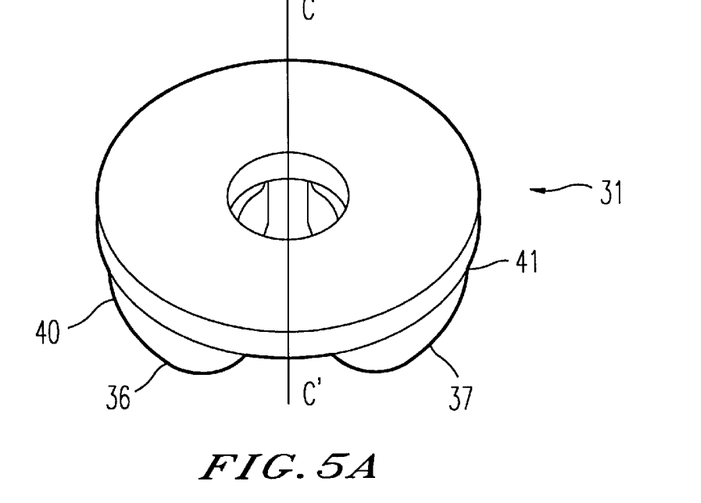
FIG. 5 represents an exploded view of a second embodiment.
Figure 5B:
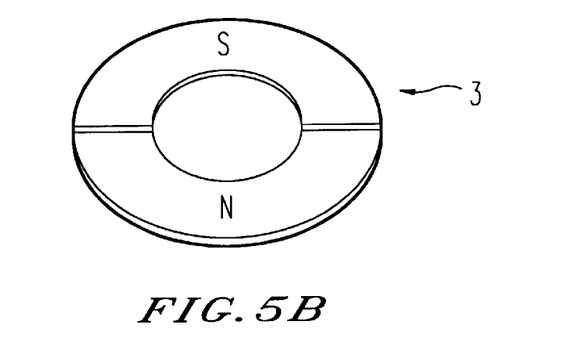
Figure 5C:
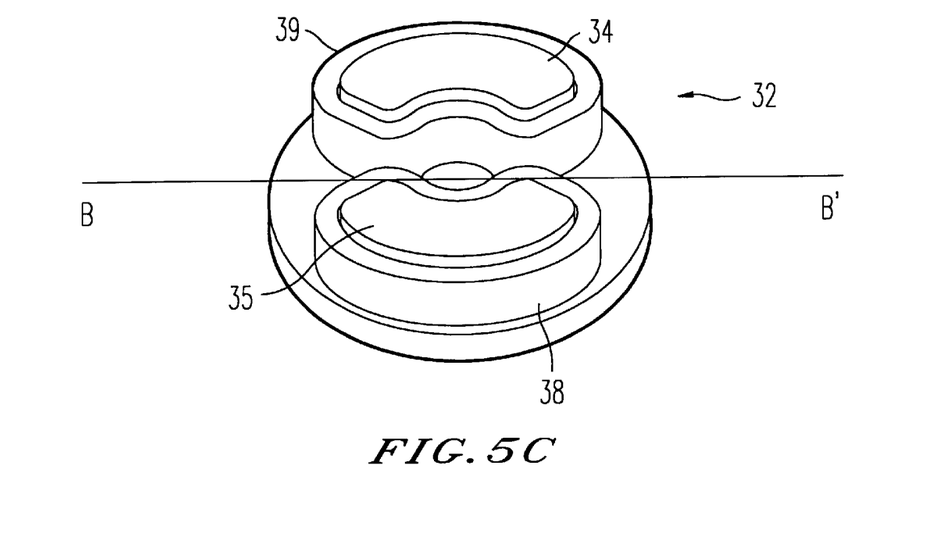

FIG. 5 represents a second embodiment of the actuator in the "disk magnet" configuration.

In this embodiment, the disk magnet (3) is integral not with a yoke but only with a connecting part with a shaft, which is not shown in this figure.

The fixed portion is provided with two stator portions (31, 32) disposed on both sides of the magnet (3). Each of the stator portions (31, 32) is provided with two pole shoes, respectively (34, 35) and (36, 37). Each of the pole shoes (34 to 37) is excited by a coil (38 to 41). The two stator portions (31, 32) are offset angularly in such a manner that their planes of symmetry BB' and CC' form an angle of 90° between them.

In this embodiment, the pole shoes can extend for an angle larger than 90°.

In this way, the distance d between the ends of two consecutive shoes can be reduced to 0 or can even have a negative sign. Preferably, the pole shoes (35 to 37)

extend over the largest possible angular aperture, and allow a minimum space to be present for passage of coils.

Figure 6A:
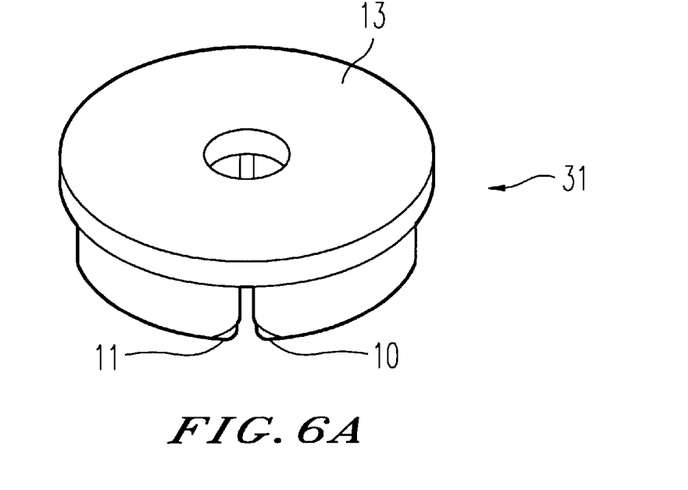
FIG. 6 represents an exploded view of a third embodiment.
Figure 6B:
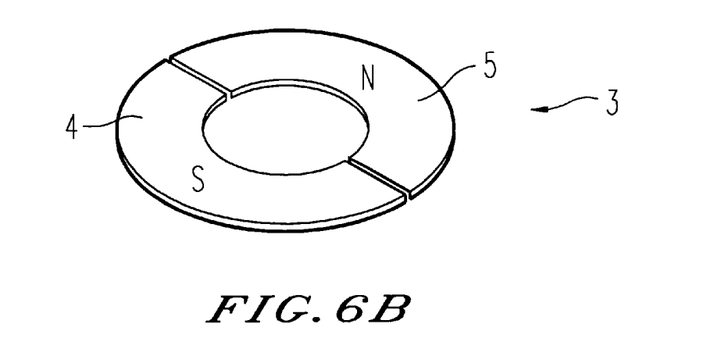
Figure 6C:
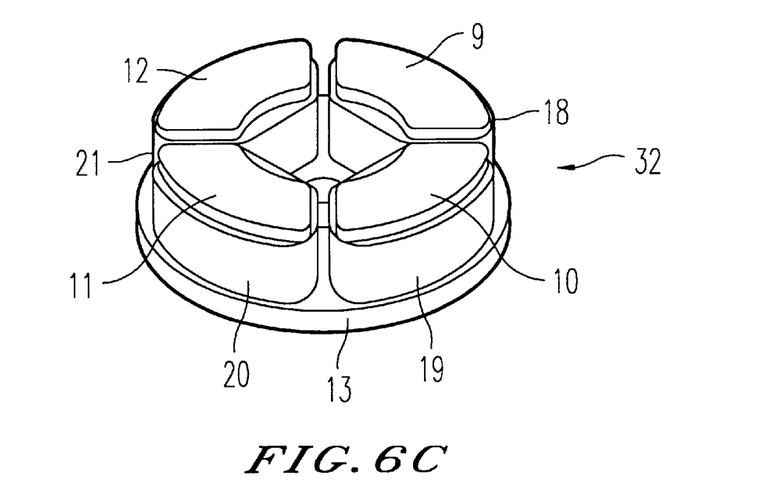

FIG. 6 represents another embodiment of an actuator of the disk-magnet type. The two stator portions (31, 32) are symmetrical relative to the plane of the thin magnet (3), and each is provided with four pole shoes (9 to 12). The pole shoes of one of the pole [sic: stator?] portions (32) are excited by electric coils (18 to 21), while the pole shoes of the other stator portion (31) can be optionally excited or non-excited.

Figure 7:
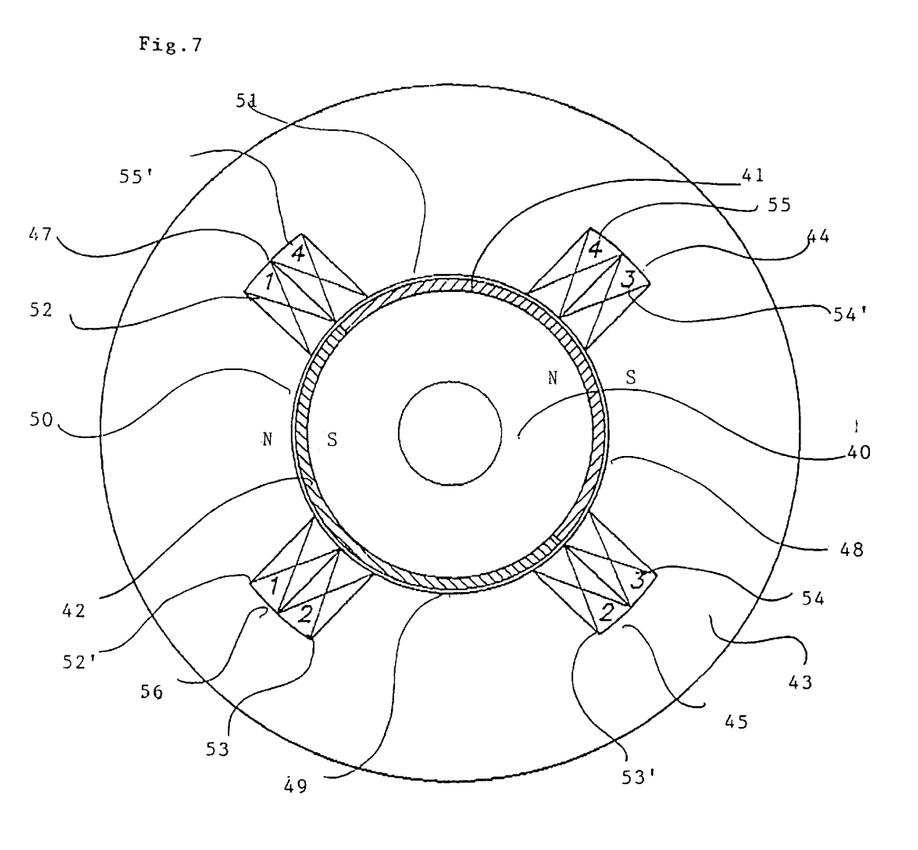
FIG. 7 represents a transversal sectional view of a second constructional variant of the actuator.
Figure 8:
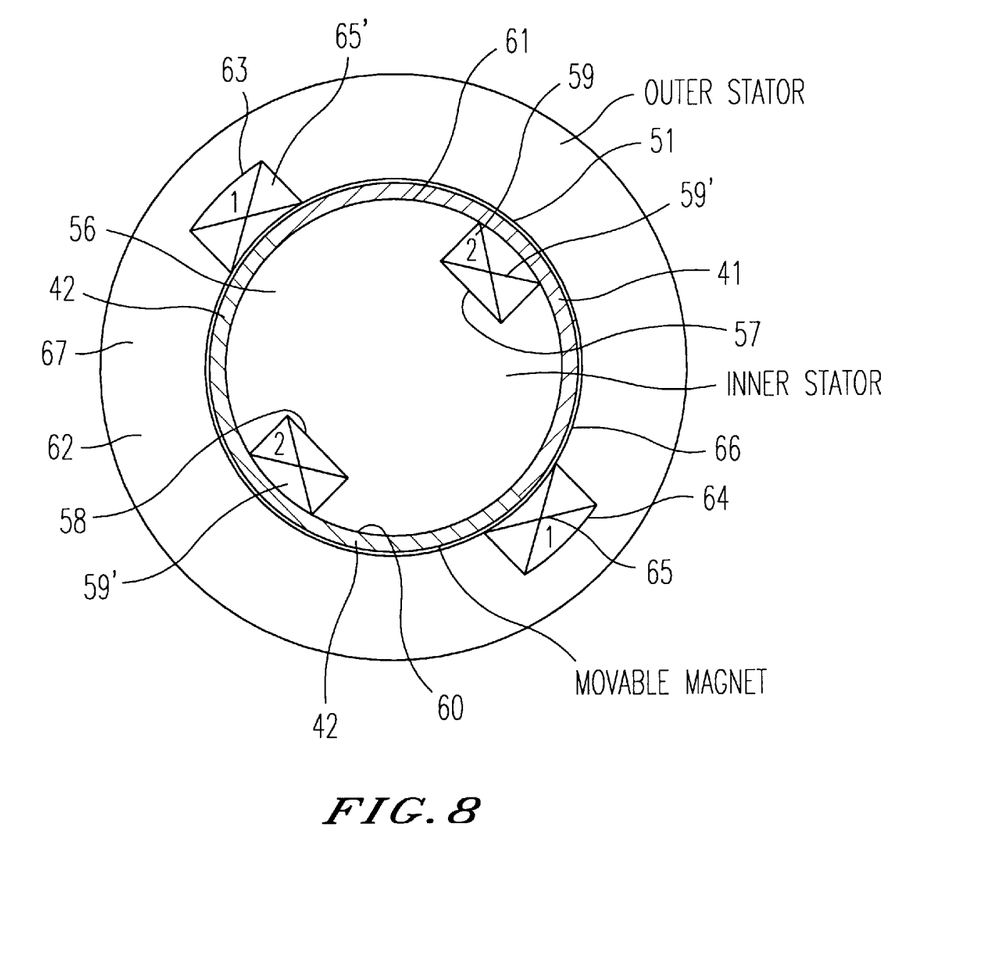
FIG. 8 represents a transversal sectional view of another embodiment of the actuator.

FIGS. 7 and 8 represent two embodiments of the actuator variant with the tubular magnet.

FIG. 7 represents an embodiment in which the stator portion is provided with an inner cylindrical part (40) integral with the tubular magnet formed by two pairs of poles (41, 42) in the shape of tiles extending for about 180°, each magnetized radially in opposite directions. It is also possible to provide an inner cylindrical part that is not integral with the tubular magnet.

The outer stator portion (43) comprises a cylindrical part having four grooves (44 to 47), which define between them the four pole shoes (48 to 51). Each of the shoes (48 to 51) is encircled by a coil in the shape of a loop (52 to 55).

For the actuators according to the tubular variant, the dimensions P and d are measured along the internal surface of the pole shoes.

The energization sequences are described hereinbelow with the convention that the rotor is represented in FIG. 7 in −45° position.

| Position of rotor at end of travel | Coil 1 | Coil 2 | Coil 3 | Coil 4 |
|---|---|---|---|---|
| −45° | + | + | − | − |
| −135° | + | − | − | + |
| +135° | − | − | + | + |
| +45° | − | + | − | + |

FIG. 8 represents another embodiment of an actuator with tubular structure.

The stator portion is provided with an inner part (56) of cylindrical shape having two diametrically opposite grooves (57, 58). A loop-type coil (59) encircles the inner stator portion (56) and is lodged in the two grooves (57, 58). The two grooves (57, 58) define between them the first two shoes (60, 61). The second stator portion comprises a tubular part (62) also having two grooves (63, 64) offset by 90° relative to the two grooves (58, 59) of the inner part (56). The other two shoes (66, 67) are formed between these two grooves (63, 64). A second electric coil (65) is lodged in these grooves (63, 64). In the described example, these grooves are formed on the inner surface of the tubular part (62).

It is understood that these examples of coil arrangements are described by way of example, and in no way do they constitute an exhaustive list of conceivable options.

The present invention is in no way limited to the foregoing embodiment, but to the contrary covers all variants.

I claim:

1. An electromagnetic actuator having four positions that are stable in the absence of current and in which rapid displacement occurs between said stable positions under the action of a current, for operation of a device such as a valve or switch, the actuator comprising:

a yoke;

a rotationally movable magnetic disk, having two pairs of magnetic poles magnetized traversely in alternate directions, and a stator structure provided with four pole shoes each of developed length P, each equipped with an exciting coil, each two consecutive poles of said four pole shoes being separated by distance d, the magnetic disk being movable in an air gap of dimension E between said stator and said yoke, the dimensional ratios P/E and P/d being larger than 8, wherein the stator structure is configured in such a manner as to ensure magnetic locking in each of said four stable positions.

2. An electromagnetic actuator according to claim 1, characterized in that the movable portion comprises a yoke of circular cross section integral with said thin magnet in the shape of a disk, having two complementary sectors extending for about 180° and magnetized in two opposite axial directions, the pole shoes of the stator portion disposed facing the movable magnet having an annular shape extending for about 90°.

3. An electromagnetic actuator according to claim 1, characterized in that the semi-annular surface of the pole shoes of the stator portion is extended by a foot of smaller cross section, the exciting coil encircling the said foot.

4. An electromagnetic actuator according to claim 1, characterized in that the shoes are integral with shaped magnetic-flux-closing part.

5. An electromagnetic actuator according to claim 1, characterized in that a first pair of two opposite coils is energized by a constant current, and the other portion of opposite coils is energized by a current whose polarity can be alternated.

6. An electromagnetic actuator according to claim 1, characterized in that the stator structure comprises a first ferromagnetic part having two pole shoes and a second ferromagnetic part having two pole shoes, the two stator parts being disposed on both sides of the thin disk-shaped magnet the planes passing through the top surface of the pole shoes being spaced apart by a distance E and the two stator parts being offset by 90°.

7. An electromagnetic actuator according to claim 1, characterized in that the stator portion is formed by an inner part of cylindrical shape of a ferromagnetic material, having two diametrically opposite lateral notches for positioning of an electric coil, and by a peripheral part of tubular shape having two longitudinal inner grooves for positioning of a second electric coil, the median planes of the two coils being perpendicular.

8. An electromagnetic actuator according to claim 1, characterized in that the stator portion is formed by an inner part of cylindrical shape of a ferromagnetic material, and by a peripheral part of tubular shape having four longitudinal inner grooves for positioning of four electric coils, the median planes of the two pairs of coils being angularly offset by 90°.

9. An electromagneic actuator according to claim 2, characterized in that the semi-annular surface of the pole shoes of the stator portion is extended by a foot of smaller cross section, the exciting coil encircling the said foot.

10. An electromagnetic actuator according to claim 2, characterized in that the shoes are integral with a disk-shaped magnetic-flux-closing part.

11. An electromagnetic actuator according to claim 3, characterized in that the shoes are integral with a disk-shaped magnetic-flux-closing part.

12. An electromagnetic actuator according to claim 2, characterized in that a first pair of two opposite coils is energized by a constant current, and the other portion [sic:

pair?] of opposite coils is energized by a current whose polarity can be alternated.

13. An electromagnetic actuator according to claim 3, characterized in that a first pair of two opposite coils is energized by a constant current, and the other portion [sic: pair?] of opposite coils is energized by a current whose polarity can be alternated.

14. An electromagnetic actuator according to claim 4, characterized in that a first pair of two opposite coils is energized by a constant current, and the other portion [sic: pair?] of opposite coils is energized by a current whose polarity can be alternated.

* * * * *